May 25, 1965  D. O. HITZMAN  3,185,215
CONTROLLING BACTERIA WITH HYDROCARBON GASES
Filed May 1, 1959
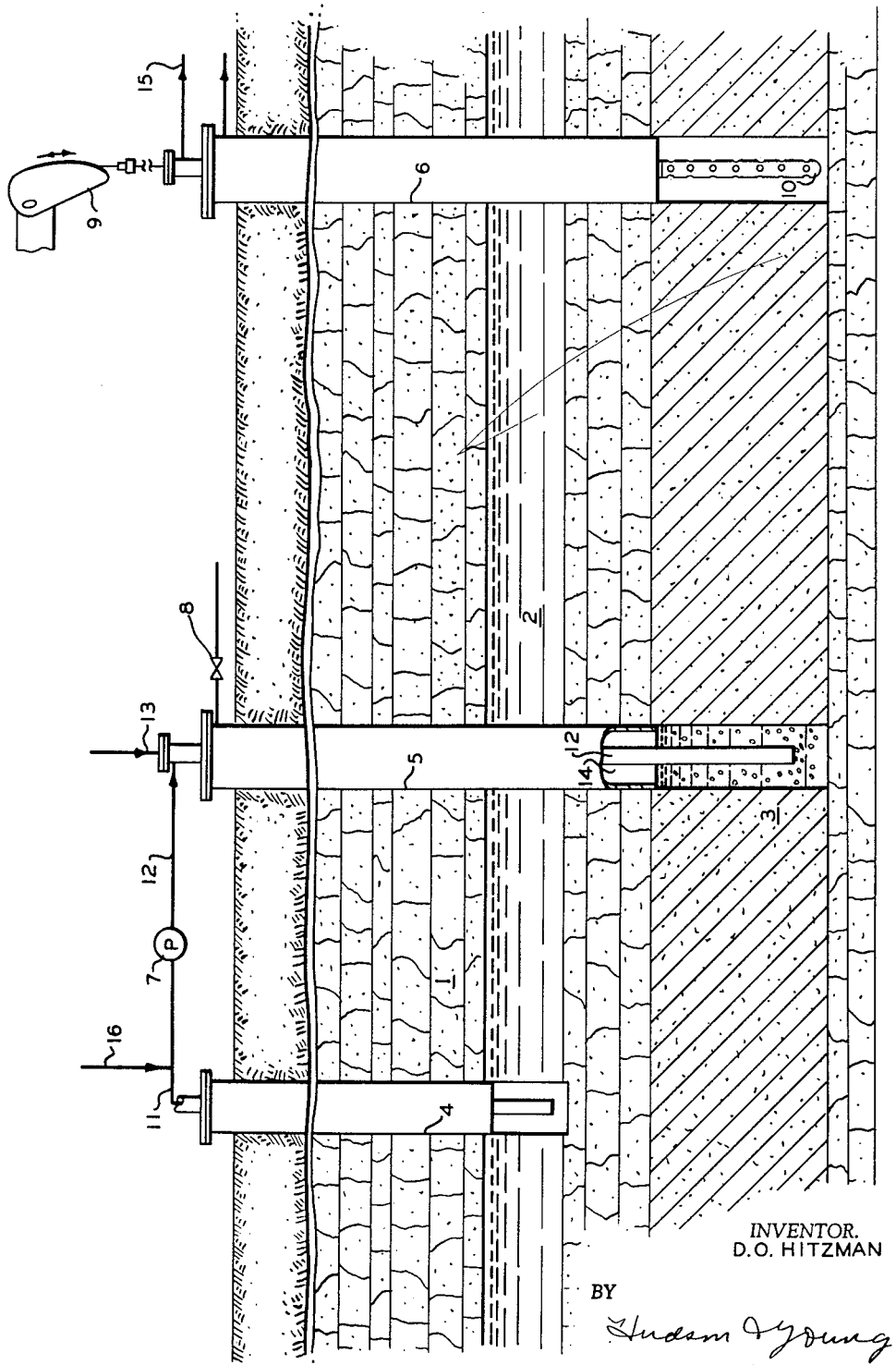
INVENTOR.
D.O. HITZMAN
BY
Hudson & Young
ATTORNEYS

3,185,215
CONTROLLING BACTERIA WITH HYDROCARBON GASES
Donald O. Hitzman, Bartlesville, Okla., assignor to Phillips Petroleum Company, a corporation of Delaware
Filed May 1, 1959, Ser. No. 810,451
11 Claims. (Cl. 166—9)

This invention relates to the inhibition of the growth of bacteria using hydrocarbon gases. In one of its aspects, the invention relates to the inhibition of the growth of bacteria in water by incorporating natural gas into the water. In another aspect of the invention, it relates to the inhibition of the growth of bacteria in water by incorporating into the water a normally gaseous paraffin hydrocarbon, for example, butane. In a further aspect of the invention, it relates to the treatment of water used in water flooding as in an oil field by incorporating into the water a normally gaseous paraffin hydrocarbon either as such or as it is contained in another gas. In a more specific aspect of the invention, it relates to a method of water flooding an oil field which comprises injecting into said oil field water having incorporated therein natural gas or a gas containing a principal constituent of natural gas. In a still further aspect of the invention, it relates to a method of treating a water flooded oil field which comprises injecting into the water in said field under a substantial pressure a normally gaseous paraffin hydrocarbon. Other aspects which may be variations and/or combinations of the foregoing aspects appear from this disclosure.

It has now been found that the growth of anaerobic and of aerobic type organisms such as will grow in water can be prevented by injecting into the water and maintaining in the water a normally gaseous paraffin hydrocarbon, for example, as contained in natural gas. It is known that natural gas contains usually a preponderant portion of methane and, in many instances, ethane. It is also known that natural gas contains lesser quantities of propane and butane. It has further been found that butane, like natural gas, will inhibit the growth of microorganisms as it appears below.

It is an object of the invention to provide a method for the prevention of the growth of bacteria in water. It is another object of this invention to provide a method for the inhibition of the growth of bacteria in water as in a water flooded oil field. It is a further object of the invention to provide a method for the water flooding of an oil field with water, which has been treated to prevent the growth of bacteria or microorganisms therein. Other aspects, objects, and the several advantages of the invention are apparent from a study of this disclosure, the drawing, and the claims.

According to this invention, there is provided a method for preventing or inhibiting the growth of bacteria in water which comprises, broadly, treating said water with a normally gaseous paraffin hydrocarbon. As the normally gaseous paraffin hydrocarbon, there can be used natural gas, methane, propane, ethane, and butane. Usually the gas employed is employed in a high enough concentration, as can be judged by routine test, to obtain a desired effect.

The following examples support and illustrate the invention claimed.

EXAMPLE I

Four bottles were filled with a nutrient solution for optimum sulfate-reducing basteria growth. Two of the bottles were inoculated with bacteria and allowed to stand. The two remaining bottles are inoculated in like manner as the first two bottles but these bottles were connected to a natural gas source and natural gas bubbled therethrough continuously. The following table shows the results observed.

| Inoculated bottles | Growth |
|---|---|
| 2 bottles—no natural gas present | Bottle turned black with growth in 25 hours. |
| 2 bottles—natural gas bubbled through continuously. | No growth or blackening visible for at least six days. |

*Analysis of natural gas used in Example I*

| | Mol Percent | | Mol Percent |
|---|---|---|---|
| $C_1$ | 86.94 | $nC_4$ | .40 |
| $C_2$ | 6.84 | $IsoC_5$ | .06 |
| $CO_2$ | .11 | $nC_5$ | .08 |
| $C_3$ | 2.10 | $N_2$ | 3.31 |
| $iC_4$ | .16 | | |

It will be noted that this natural gas sample contained methane, ethane, and propane with a small amount of butane.

Example II of the application presents data for butane. General information on composition of natural gases shows that dry natural gas consists predominately of methane, with relatively small amounts of ethane and propane. The analyses shown in the table illustrate the compositions of natural gases.

*Composition of various natural gases*

| Constituent | Composition, percent of gas from— | | |
|---|---|---|---|
| | Mid-Continent Field | Pennsylvania | Torrance Field, California |
| Carbon dioxide | 0.8 | | 1.1 |
| Nitrogen | 3.2 | 1.1 | |
| Hydrogen sulfide | | | |
| Methane | 96.0 | 67.6 | 87.0 |
| Ethane | | 31.3 | 4.0 |
| Propane | | | 2.5 |
| Butane | | | 2.0 |
| Petanes and heavier | | | 3.4 |

Further information on the compositon of various natural gases is as follows:

*Analyses of gases*

| Material | Analysis, percent by volume | | | | | | $C_5H_{12}$ and heavier |
|---|---|---|---|---|---|---|---|
| | $CH_4$ [1] | $C_2H_6$ | $C_3H_8$ | $iC_4H_{10}$ | $C_4H_{10}$ | $C_4H_8$ | |
| 1. Wet natural gas | 85.3 | 1.6 | 6.8 | 1.5 | 1.4 | | 3.4 |
| 2. Wet natural gas | 70.0 | 5.9 | 5.7 | 2.3 | 3.1 | | 9.9 |
| 3. Wet natural gas | 79.8 | 6.48 | 6.22 | 1.35 | 2.33 | | 2.97 |
| 4. Dry gas [2] | 85.9 | 6.31 | 7.74 | 0.78 | 0.69 | | 0.16 |

[1] $N_2$, $CO_2$, $O_2$, etc., usually counted as $CH_4$.
[2] The wet gases of 3 yielded the dry gases of 4.

The foregoing example shows that the natural gas not only prevented growth but also any visible blackening, indicating substantially complete inhibition if not, indeed, destruction of the bacteria.

EXAMPLE II

Gases as indicated were passed through five columns of water, each of which contained the same soil suspension.

(1) Butane, 50%—air 50%
(2) Nitrogen, 50%—air 50%
(3) Nitrogen, 100%
(4) Air, 100%
(5) Butane, 100%

Samples were removed from the columns at intervals and tested for the number of microorganisms surviving with time. The results in plate count agar medium.

Number of microorganisms per ml. of samples in the presence of:

| Time hrs. of gas passage | (1) Butane, 50%— Air, 50% | (2) Nitrogen, 50%— Air, 50% | (3) Nitrogen, 100% | (4) Air, 100% | (5) Butane, 100% |
|---|---|---|---|---|---|
| 0 | 8,000 | 8,000 | 8,000 | 8,000 | 8,000 |
| 2.5 | 2,000 | 8,000 | 3,000 | 30,000 | 2,000 |
| 4.5 | 10,000 | 9,000 | 4,000 | 10,000 | 6,000 |
| 6.5 | 6,000 | 8,000 | 3,000 | 10,000 | 4,000 |
| 7.5 | 10,000 | 10,000 | 7,000 | 10,000 | 1,000 |
| 23 | 300,000 | 1,640,000 | 40,000 | 1,530,000 | 2,000 |
| 27 | 600,000 | 2,000,000 | 80,000 | 2,000,000 | 1,000 |
| 29 | 750,000 | 2,000,000 | 70,000 | 2,000,000 | 1,000 |
| 31 | 1,600,000 | 5,000,000 | 100,000 | 3,000,000 | 300 |

The results indicate butane is inhibitory for microbial growth. Also, as indicated in column 5, in which 100 percent butane was used, the count at the end of 31 hours was considerably less than that at the beginning of the experiment.

EXAMPLE III

Experiments were performed in glass columns through which the indicated gases were bubbled at a very slow rate (equal). The tubes were filled with a mineral media and a soil slurry. Each tube was prepared in exactly the same manner from the same soil slurry. The only difference in the tubes was in the gases passed therethrough. Counts of the surviving organisms were made on two media; mineral media and mineral medium +0.5 percent butanol. The results show the following filling power of the hydrocarbon gas with time.

| Time, hrs. | Microbial count on mineral media | | Microbial count in mineral medium plus 0.5 butanol | |
|---|---|---|---|---|
| | Butane, 50%— Air, 50% | Air, 100% | Butane, 50%— Air, 50% | Air, 100% |
| 0 | 85 | 80 | 82 | 80 |
| 3 | 90 | 80 | 79 | 80 |
| 5 | 80 | 68 | 24 | 40 |
| 8 | 60 | 80 | 18 | 84 |
| 24 | 25 | 150 | 14 | 300 |

The data show that the gas exerts a killing effect which does not occur with only air. Thus, with 50 percent butane the microbial count was reduced from 85 to 25 in 24 hours, without the presence of butanol and with 0.5 percent butanol the count was reduced from 82 to 14. During the 24 hour period in the respective cases, when only air was bubbled through the glass columns, the growth rates were, as indicated, sufficient to increase the count from 80 to 150 and from 80 to 300, respectively.

In the drawing, 1 designates a formation, 2 designates a water stratum, 3 designates an oil bearing zone, 4 is a water well, 5 is an input well, 6 is an oil producing well, and 7, 8, and 9 are, respectively, a water producing pump, a valve, and a pump beam of deep well pump 10 of an oil producing pump. Water producing in well 4 is raised through pipe 11 and pumped by pump 7 by way of pipe 12 into input well 5. Pipe 12 extends into the oil stratum. Natural gas is injected under pressure into the water in pipe 11 or pipe 12 by means of pipe 16 or pipe 13. The gas saturates the water in pipe 11 or pipe 12 and saturated water passes out into the oil stratum seeking a level below the oil. The water is inhibited with respect to bacteria according to the invention, as described herein. If desired, gas can be released from well 5 by way of annulus 14 by opening valve 8. As the gas charged water fans out at a level generally below the oil and gas continues to be released therefrom, a good portion of the area around the input well will be swept by these gases. As will be understood by one skilled in the art, the rising water causes a rising oil level and the oil can be removed from oil well 6 by means of pump 10. The oil is recovered by way of pipe 15.

One skilled in the art will recognize that it is standard known practice to grow bacteria using a blanket of gas over the culture. In anaerobic culture methods it is necessary to even exclude atmospheric oxygen. In the brewer anaerobic jar, illuminating gas is used after evacuation to exclude oxygen. Thus, it is clear that it is unexpected to find that by bubbling a normally gaseous hydrocarbon such as, say, methane or butane, through water that it would kill even anaerobic bacteria.

The invention herein described and claimed is to be distinguished from situations wherein an inert gas is used to blanket the top of a liquid. Indeed, it is not necessary according to the present invention to have any gas over the liquid, provided the gas is in the liquid.

It is necessary, according to the invention, to bring the gas, say, natural gas, into intimate contact with the water as by agitation or pumping the same through the water with sufficient pressure that it will penetrate into the water.

As an important feature of the invention the gas which is pumped into the water or as the case may be, into the water flooded oil field, can be pumped thereinto until a substantial quantity of hydrogen sulfide has been swept from at least that area of the field which is being operated.

Reasonable variation and modification are possible within the scope of the foregoing disclosure, drawing and appended claims to the invention the essence of which is that gaseous hydrocarbons as herein described have been found to be antibacterial in character when dispersed in water and have been successfully used to control, inhibit and/or kill bacteria; in a particular application of the invention it serves to control bacteria growth in oil field water flooding operations; and that apparatus suitable for said last mentioned operations has been provided as described.

I claim:
1. A method for preventing the of growth of sulfate-reducing bacteria in a closed water system under pressure which comprises treating said water by incorporating into and retaining therein, for a time during which growth is to be inhibited, a quantity of a gas consisting essentially of a normally gaseous paraffin hydrocarbon sufficient to inhibit the growth of said sulfate-reducing bacteria in said water.

2. A method according to claim 1 in which the said normally gaseous hydrocarbon is natural gas.

3. A method according to claim 1 in which the said normally gaseous hydrocarbon is butane.

4. A method according to claim 1 in which the said normally gaseous hydrocarbon is propane.

5. A method according to claim 1 in which the said normally gaseous hydrocarbon is ethane.

6. A method according to claim 1 in which the said normally gaseous hydrocarbon is methane.

7. A method of killing sulfate-reducing bacteria in water which comprises treating said water by incorporating under pressure and retaining therein, for a time during which killing is to be continued, a quantity of a gas consisting essentially of a normally gaseous paraffin hydrocarbon sufficient to kill said sulfate-reducing bacteria in said water.

8. The method according to claim 7 in which the said normally gaseous hydrocarbon is natural gas.

9. The method according to claim 7 in which the said normally hydrocarbon is butane.

10. In the method of water flooding an oil field in which sulfate-reducing bacteria are present in water supply and injection conduits of an input well and which sulfate-reducing bacteria are undesirable because said bacteria in growing throughout said conduits cause plugging of the formation surrounding said input well, the improvement comprising continuously injecting under pressure into the said supply and injection conduits and retaining therein in intimate contact with the water therein for the time during which growth of bacteria is to be prevented an amount effective to prevent growth of sulfate-reducing bacteria therein of an essentially normally gaseous paraffn hydrocarbon; injecting water together with said normally gaseous hydrocarbon into an injection pipe of said input well and releasing said normally gaseous paraffin hydrocarbon from said input well.

11. In a method of water flooding an oil field in which sulfate-reducing bacteria are present in the water supply and injection conduits of an input well and which sulfate-reducing bacteria are undesirable because said bacteria in growing throughout said conduits cause plugging of the formation surrounding said input well, the improvement comprising injecting water under pressure into all of said conduits supplying water to said input well, incorporating into and retaining in said conduits, in intimate contact with the water therein for the time during which growth of bacteria is to be prevented, an amount effective to prevent growth of sulfate-reducing bacteria in said conduits, of an essentially normally gaseous paraffin hydrocarbon, and injecting water together and in said contact with said normally gaseous paraffin hydrocarbon into said input well.

References Cited by the Examiner
UNITED STATES PATENTS

| | | | |
|---|---|---|---|
| 2,115,379 | 4/38 | Wolf | 166—52 |
| 2,230,001 | 1/41 | McConnell et al. | 166—9 |
| 2,347,769 | 5/44 | Crites | 166—7 X |
| 2,838,118 | 6/58 | Ruskin et al. | 166—42 |
| 2,871,945 | 2/59 | Spearow | 166—52 |
| 2,875,836 | 3/59 | Stiff et al. | 166—42 |
| 2,912,378 | 11/59 | Bernard | 166—9 X |

OTHER REFERENCES

Beerstecher, E. 1954 Petroleum Microbiology, Elsevier Press, Inc. N.Y. Pages 260–270 and 296–302 relied on.

CHARLES E. O'CONNELL, *Primary Examiner.*